(12) United States Patent
Steiger et al.

(10) Patent No.: US 6,230,948 B1
(45) Date of Patent: May 15, 2001

(54) GRIPPING MOTOR-VEHICLE CUP HOLDER

(75) Inventors: Rainer Steiger, Landshut (DE); Traci Angela Neist, Palo Alto; John Raff, Menlo Park, both of CA (US); Martin Christ, Lüdenscheid (DE)

(73) Assignees: Bayerische Motoren Werke AG, Munich; Sarnatech Paulmann & Crone GmbH, Wetter, both of (DE)

( * ) Notice: Subject to any disclaimer, the term of this patent is extended or adjusted under 35 U.S.C. 154(b) by 0 days.

(21) Appl. No.: 09/472,499

(22) Filed: Dec. 27, 1999

(30) Foreign Application Priority Data

Dec. 28, 1998 (DE) .......................................... 298 22 972 U

(51) Int. Cl.7 .................. B60N 3/10; B60R 7/04
(52) U.S. Cl. .................. 224/539; 224/552; 224/553; 224/926; 248/311.2
(58) Field of Search .................. 224/926, 545, 224/552, 553, 567, 570; 248/311.2; 297/188.01, 188.14

(56) References Cited

U.S. PATENT DOCUMENTS

| | | | |
|---|---|---|---|
| 5,154,380 | * 10/1992 | Risca | 248/311.2 X |
| 5,385,325 | * 1/1995 | Rigsby | 224/926 X |
| 5,398,898 | * 3/1995 | Bever | 248/311.2 X |
| 5,697,593 | * 12/1997 | Bieck | 224/926 X |
| 5,782,448 | * 7/1998 | Withun et al. | 248/311.2 |
| 5,791,618 | * 8/1998 | Lancaster | 224/926 X |
| 5,839,711 | * 11/1998 | Bieck et al. | 248/311.2 X |
| 5,888,775 | * 3/1999 | Sik | 224/926 X |
| 5,988,579 | * 11/1999 | Moner, Jr. et al. | 224/926 X |
| 6,039,206 | * 3/2000 | DeFrancesco | 248/311.2 X |

* cited by examiner

*Primary Examiner*—Gregory M. Vidovich
(74) *Attorney, Agent, or Firm*—Herbert Dubno; Andrew Wilford

(57) ABSTRACT

A vehicle cup holder has a housing forming an upwardly open cup-shaped seat centered on an upright seat axis and having a side wall and a floor and a plurality of gripping arms spaced around the seat on the side wall and pivotal about respective upright axes between radially inner positions projecting into the seat and radially outer positions generally disengaged from the seat. A drive under the floor is connected to the arms for displacing them synchronously between the inner and outer positions.

22 Claims, 7 Drawing Sheets

GRIPPING MOTOR-VEHICLE CUP HOLDER

FIELD OF THE INVENTION

The present invention relates to a cup holder. More particularly this invention concerns a cup holder of the type normally provided in a motor vehicle.

BACKGROUND OF THE INVENTION

A standard cup holder of the type used in a motor vehicle, although of course suitable for use elsewhere such as on a golf pull cart, typically has an upwardly open cup-shaped seat dimensioned to hold the largest normally encountered cup or beverage container. When a large beverage container, such as a 20-oz soda bottle, is set in it, the fit is fairly good and the beverage container is solidly held. When, however, a smaller-diameter container or a tapered container is set in such a cup holder, it is fairly loose and can wobble from side to side as the vehicle moves, spilling or even allowing the beverage container to hop out of the holder.

OBJECTS OF THE INVENTION

It is therefore an object of the present invention to provide an improved cup holder.

Another object is the provision of such an improved cup holder which overcomes the above-given disadvantages, that is which solidly holds both large and small beverage containers.

SUMMARY OF THE INVENTION

A vehicle cup holder has according to the invention a housing forming an upwardly open cup-shaped seat centered on an upright seat axis and having a side wall and a floor and a plurality of gripping arms spaced around the seat on the side wall and pivotal about respective upright axes between radially inner positions projecting into the seat and radially outer positions generally disengaged from the seat. A drive under the floor is connected to the arms for displacing them synchronously between the inner and outer positions.

The arms can either be thin so they lie against the side wall in the outer position or can be received in pockets formed in this side wall. Their synchronous movement ensures that a beverage container set in the seat will be held on center and gently gripped so that it will not tip in the seat. The arms can themselves be springy for a delicate but firm hold on the container. Springs engaging the arms can urge them into one of the positions.

The entire assembly can be a compact unit that is installed in the vehicle with nothing more needed than a connection to the battery. It can sit between the seats or be built into the dashboard. The provision of the drive underneath the seat floors gives the cup holder according to the invention a very small footprint.

Respective shafts extending generally parallel to the seat axis are journaled in the housing and carry the arms. Each such shaft has a lower end projecting past the floor and the drive includes respective drive elements fixed on the lower ends. The drive itself can be a gear or belt drive and normally is powered by an electric motor provided below the seat floor. The gear-drive system includes a drive gear rotatable about a gear axis substantially parallel to the axes of the arms and a worm gear driven by the motor and meshing with the drive gear. In this case the elements are sector gears meshing with the drive gear. More specifically, the drive gear includes a pair of coaxial gears one of which meshes with the sector gears. The drive further includes a worm gear meshing with the other of the coaxial gears and rotated by the motor. Springs braced between the coaxial gears rotationally coupling same together while permitting them to rotate limitedly relative to each other.

It is also possible according to the invention for the drive to include a cam rotatable about an axis parallel to axes of the arms and respective cam followers on the arms bearing on the cam.

The cup holder according to the invention has a sensor for detecting an object in the seat and a controller connected between the sensor and the drive for actuating the drive to move the arms from the outer to the inner position on detection of an object in the seat. Similarly the controller moves the arms from the inner position to the outer position when not detecting an object in the seat. The sensor can be an infrared proximity detector.

Normally with this system infrared proximity detector is adjacent a mouth of the seat. Furthermore another sensor can be provided adjacent a floor of the seat, typically about 5 mm above the floor. In this latter case the controller operates the sensor such that, when the arms are in the outer position, the arms are moved into the inner position only when both sensors detect an object in the seat, and, when the arms are in the inner position, the arms are moved into the outer position when either of the sensors no longer detects an object in the seat.

In a somewhat more complex system, when the arms are in the inner position and the lower sensor no longer detects an object in the seat, the controller only moves the arms into the outer position when this failure to detect an object by the lower sensor continues for a predetermined time. Thus if the container bounces a little in the seat the cup holder will not open.

The controller includes a current sensor for detecting current consumption by the motor and deenergizing the motor when the detected current consumption exceeds a predetermined threshold. This prevents overloading the motor or crushing of the container. Alternately or in addition the controller includes a timer for deenergizing the motor a predetermined time after energizing the motor.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
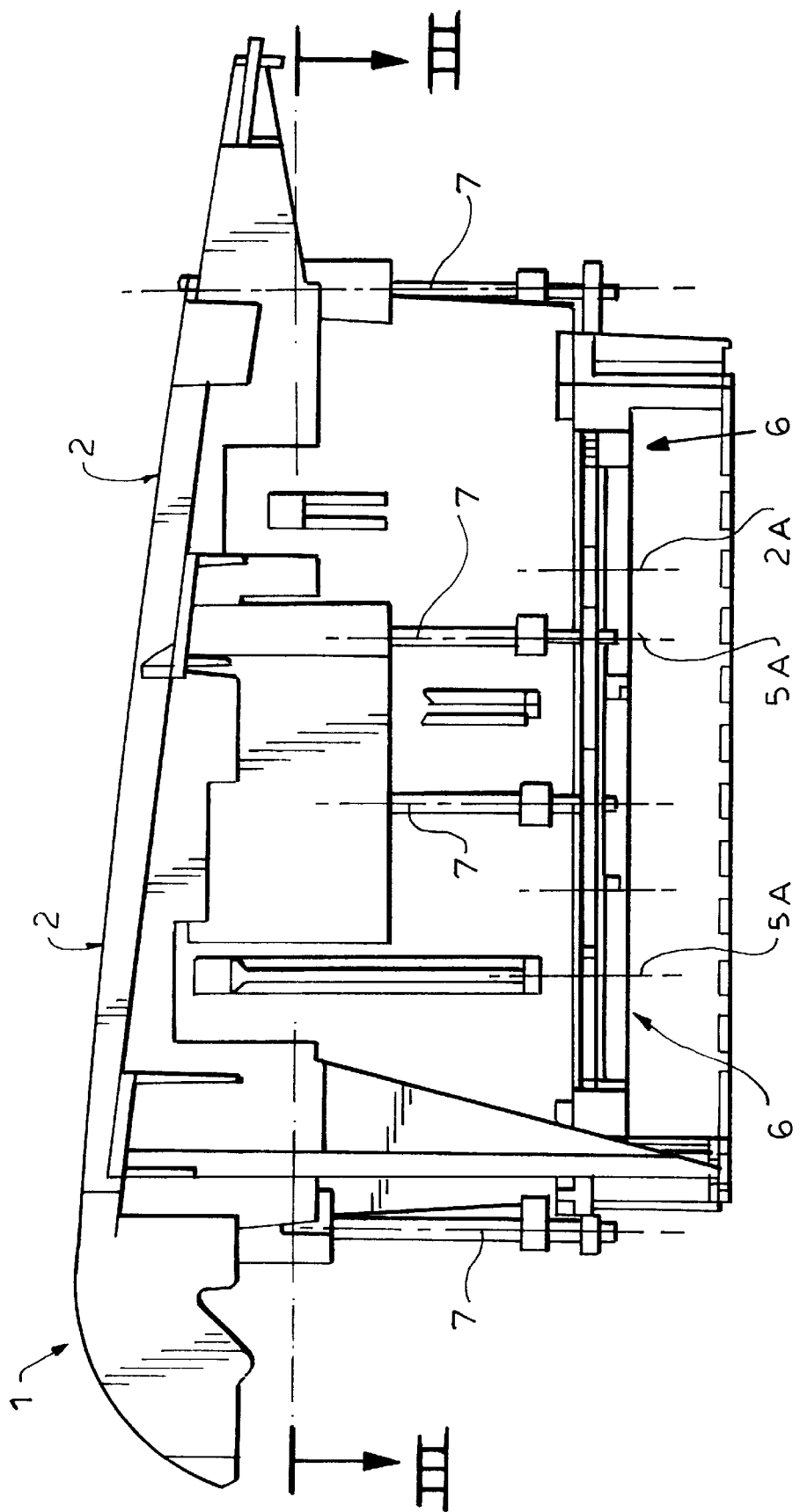
FIG. 1 is a side view of the cup holder according to the invention.
Figure 2:
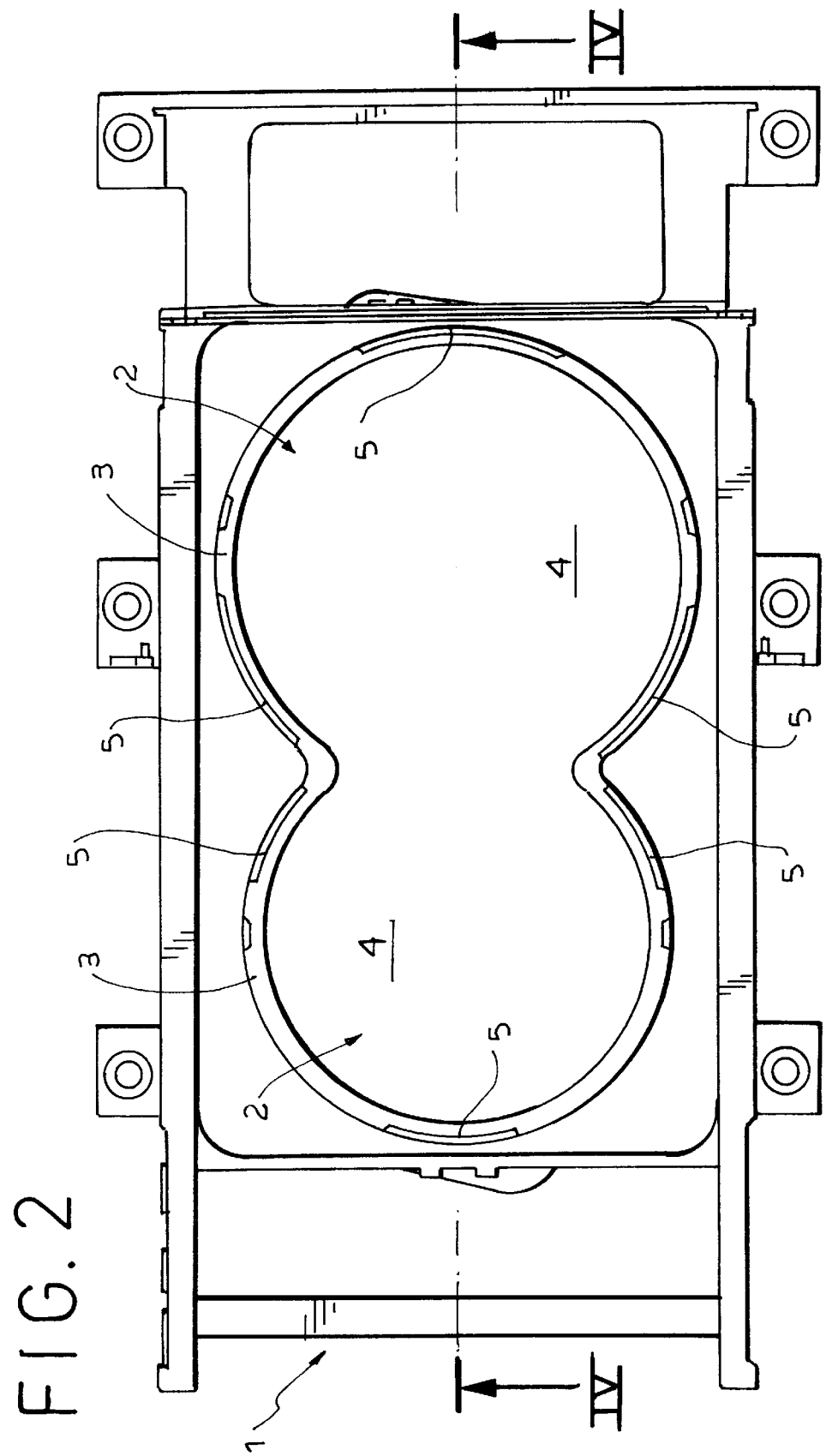
FIG. 2 is a top view of the cup holder.
Figure 3:
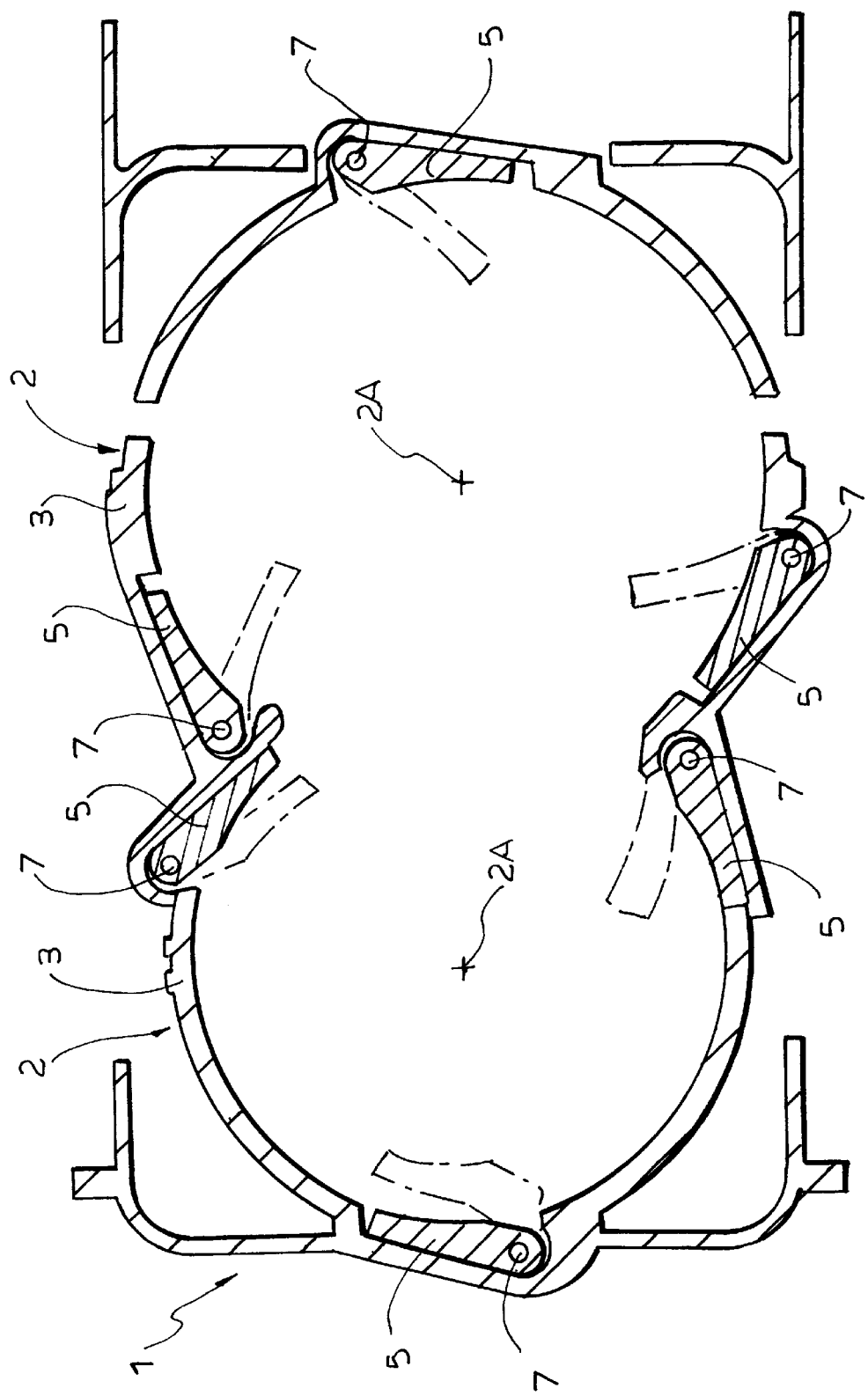
FIG. 3 is a horizontal section taken along line III—III of FIG. 1.
Figure 4:
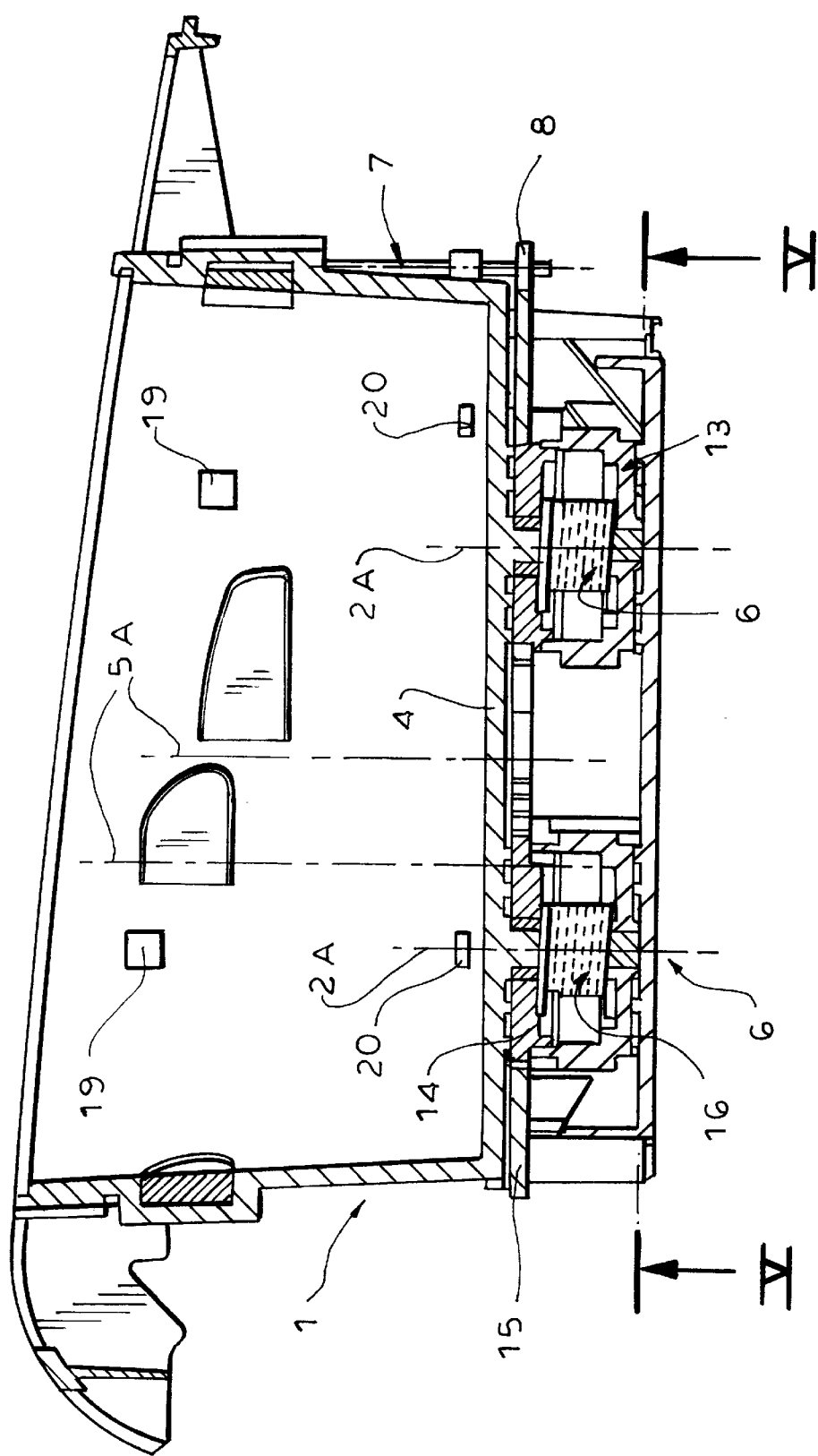
FIG. 4 is a vertical section taken along line IV—IV of FIG. 2.
Figure 5:
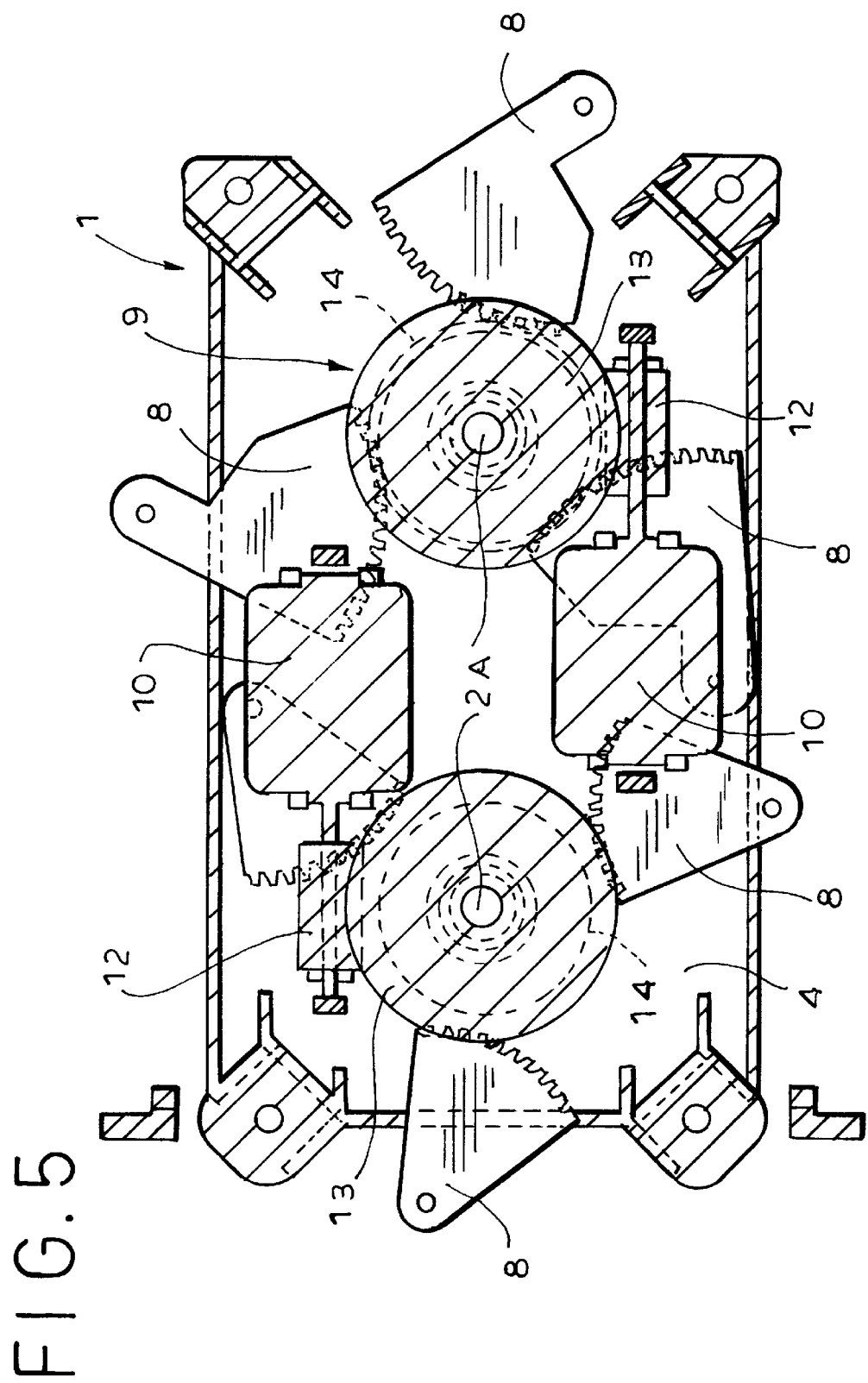
FIG. 5 is a horizontal section taken along line V—V of FIG. 4.
Figure 6:
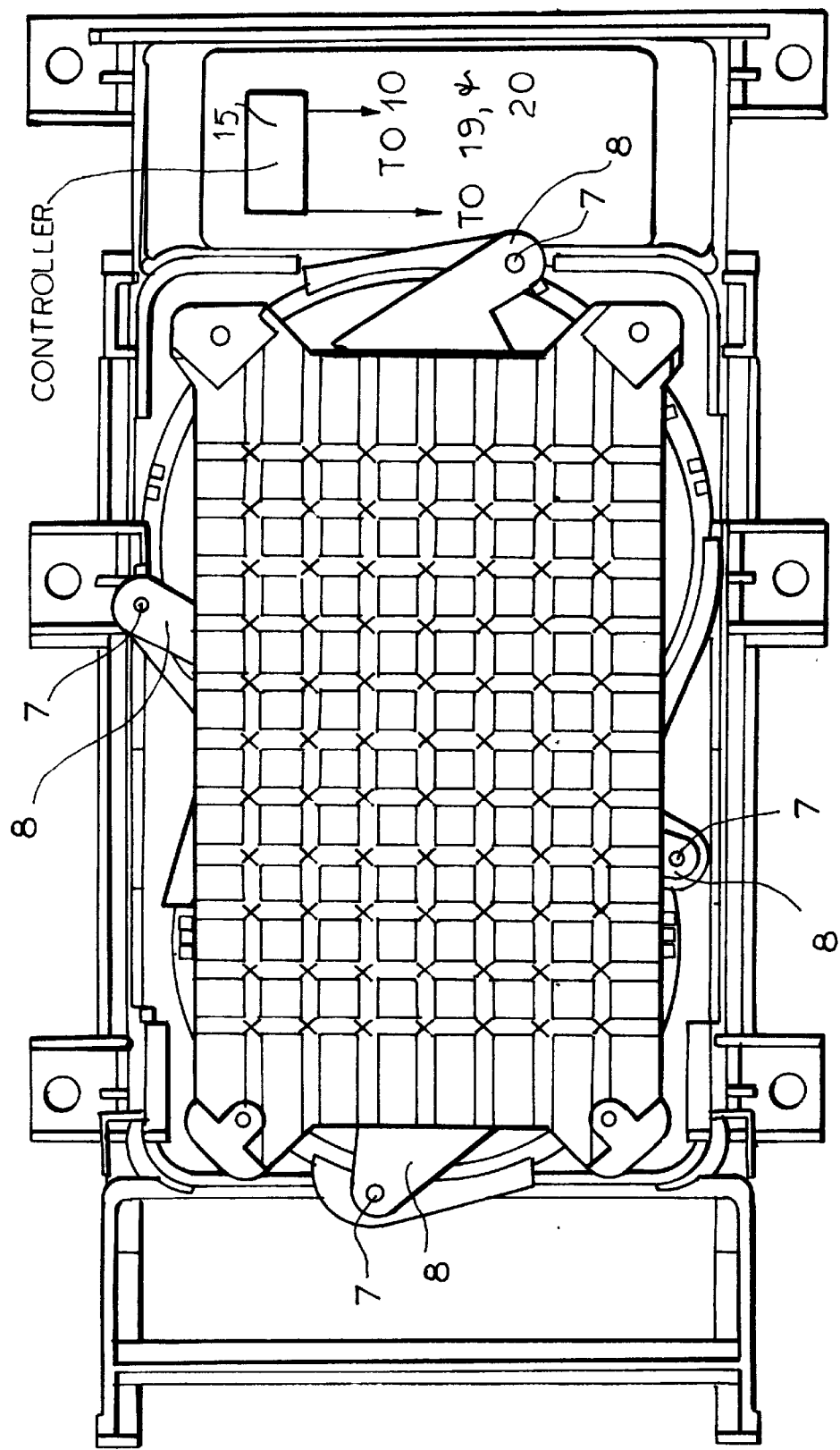
FIG. 6 is a bottom view of the cup holder.

As seen in FIGS. 1 to 7 a cup holder according to the invention has a housing 1 forming a pair of upwardly open seats 2, each having a cylindrical side wall 3 centered on a respective vertical axis 2A and a horizontal and planar floor 4 extending perpendicular to the respective axis 2A. Each seat 2 is provided with three angularly equispaced gripping arms 5 pivotal about respective arm axes 5A angularly equispaced about and radially equispaced from the respective seat axis 2A. The gripping arms 5 of each seat 2 can be pivoted about the respective axes 5A by a respective drive 6 described in more detail below. Each arm 5 is carried on a respective shaft 7 having an upper end journaled in the housing 1 adjacent the mouth of the respective cup seat and a lower end projecting out past the respective floor 4.

The gripping arms 5 of each seat 2 as shown in FIGS. 1 to 6 are fixed immediately below the floors 4 to respective sector gears 8 meshing with an upper gear 14 of a respective center drive wheel 9 rotatable about the respective seat axis 2A and having a lower coaxial gear 13. Respective small electric motors 10 have worm gears 12 meshing with teeth of the gears 13 so that rotation of these wheels 9 can rotate the respective arms 5 between the illustrated outer positions shown in solid lines and inner positions shown in dot-dash lines in FIG. 3. Respective torque springs 16 centered on the respective axes 2A about hubs of the wheels 9 each have one end seated in the gear 13 and an opposite end fitted into the respective gear 14 to urge the respective arms 5 into the outer positions.

Each seat 2 is provided with upper and lower infrared send/receive proximity detectors 19 and 20, the former adjacent the mouth of the seat 2 and the latter adjacent its floor 4. A simple reflex system can be used for the upper detector 19, and a two-part system aimed across the base of the seat 2 can be the lower sensor 20. A controller 15 connected to these detectors 19 and 20 actuates the respective motor 10 to move the gripping arms 5 in when an object is detected in the respective seat 2. Thus as a user sets a beverage container into one of the seats the detectors 19 and 20 will sequentially detect it and will swing in the gripping arms 5 to the inner gripping positions to hold the container snugly. When the user lifts the container out, as soon as the lower sensor 20 detects that it is gone, the respective drive 6 will swing out the arms 5 into the outer nongripping position.

More particularly, the sensors 19 and 20 function as shown by the following table:

| Situation | Upper sensor 19 | Lower sensor 20 | Condition | Arm Action |
|---|---|---|---|---|
| 1 | Output | | Open | None |
| 2 | | Output | Open | None |
| 3 | Output | Output | Open | Close |
| 4 | Output | | Closed | Open |
| 4a | Output | | Closed | Wait 0.25 sec, retest |
| 5 | | | Closed | Open |
| 6 | | Output | Closed | Open |

Thus when the arms 5 are in the outer position, in the above-identified open condition of the seat, an output from only the upper sensor 19 or only the lower sensor 20 will do nothing. When both sensors 19 and 20 produce an output indicating they sense the presence of an object, the arms 5 are closed, that is moved to their inner positions.

In the closed position if the lower sensor ceases to emit an output either condition 4 or condition 4a can prevail. In a simple system (condition 4) as soon as this output stops, the controller 15 presumes the beverage container is being removed from the seat and swings out the arms 5 into the open position. In a more complex system (condition 4a) the controller 15 waits 0.25 sec and checks the lower sensor again. If it is emitting an output, which would indicate that the container is just bouncing around somewhat, the controller 15 does nothing, if after this interval there is still no output from the lower sensor, the arms 5 are swung out. Similarly in the closed position if there is no output from either of the sensors or from the upper sensor, the cup holder is opened.

Either way, the controller 15 includes a current sensor for shutting off the motor 10 when its current consumption exceeds a predetermined limit. It also has a timer for shutting off the motor 10 a predetermined time after starting it.

Figure 7:
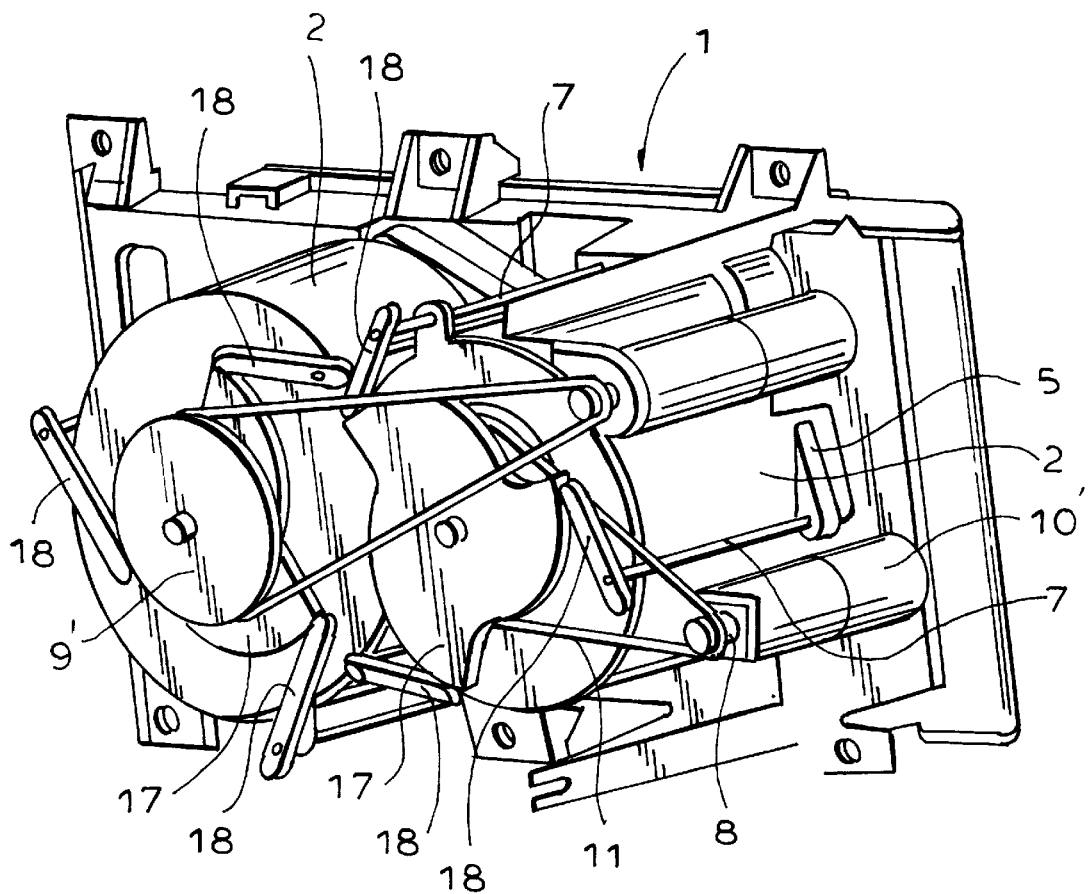
FIG. 7 is a bottom perspective view of another cup holder according to the invention.

In the arrangement of FIG. 7 motors 10' are connected via belts 11 to pulleys 9' to which are mounted three-lobe cams 17 on which bear cam-follower arms 18 carried on the arm shafts 7. The arm shafts 7 are provided with torque springs like the springs 16 to urge the respective cam-follower arms 18 against the cams 17. Otherwise this embodiment is substantially identical to the system of FIGS. 1 to 6.

We claim:

1. A vehicle cup holder comprising:
   a housing forming an upwardly open cup-shaped seat centered on an upright seat axis and having a side wall and a floor;
   a plurality of gripping arms spaced around the seat on the side wall and pivotal about respective upright axes between radially inner positions projecting into the seat and radially outer positions generally disengaged from the seat; and
   drive means under the floor connected to the arms for displacing them synchronously between the inner and outer positions.

2. The cup holder defined in claim 1 further comprising spring means engaging the arms for urging the arms into one of the positions.

3. The cup holder defined in claim 1, further comprising respective shafts extending generally parallel to the seat axis, journaled in the housing, and carrying the arms.

4. The cup holder defined in claim 3 wherein each shaft has a lower end projecting past the floor, the drive means including respective drive elements fixed on the lower ends.

5. The cup holder defined in claim 4 wherein the drive means includes a belt drive having a pulley rotatable about a pulley axis substantially parallel to the upright axes of the arms.

6. The cup holder defined in claim 4 wherein the drive means includes a gear drive having a drive gear rotatable about a gear axis substantially parallel to the upright axes of the arms.

7. The cup holder defined in claim 6 wherein the drive means further includes an electric motor and a worm gear driven by the motor and meshing with the drive gear.

8. The cup holder defined in claim 6 wherein the elements are sector gears meshing with the drive gear.

9. The cup holder defined in claim 8 wherein the drive gear includes a pair of coaxial gears, one of the coaxial gears meshing with the sector gears, the drive means further including a worm gear meshing with the other of the coaxial gears, the cup holder further comprising
   spring means braced between the coaxial gears and rotationally coupling same together while permitting them to rotate limitedly relative to each other.

10. The cup holder defined in claim 4 wherein the drive means includes a cam rotatable about an axis parallel to axes of the arms and respective cam followers on the arms bearing on the cam.

11. The cup holder defined in claim 4 wherein the drive means includes an electric motor underneath the floor.

12. The cup holder defined in claim 1, further comprising sensor means for detecting an object in the seat; and control means connected between the sensor means and the drive means for actuating the drive means to move the arms from the outer to the inner position on detection of an object in the seat.

13. The cup holder defined in claim 12 wherein the control means moves the arms from the inner position to the outer position when not detecting an object in the seat.

14. The cup holder defined in claim 12 wherein the sensor means is an infrared proximity detector.

15. The cup holder defined in claim 14 wherein the infrared proximity detector is adjacent a mouth of the seat.

16. The cup holder defined in claim 15 wherein the sensor means includes a second proximity detector adjacent a floor of the seat.

17. The cup holder defined in claim 16 wherein the second detector is about 5 mm above the floor.

18. The cup holder defined in claim 16 wherein the control means operates the sensor such that, when the arms are in the outer position, the arms are moved into the inner position only when both sensors detect an object in the seat, and, when the arms are in the inner position, the arms are moved into the outer position when either of the sensors no longer detects an object in the seat.

19. The cup holder defined in claim 18 wherein when the arms are in the inner position and the lower sensor no longer detects an object in the seat, the controller only moves the arms into the outer position when this failure to detect an object by the lower sensor continues for a predetermined time.

20. The cup holder defined in claim 19 wherein the predetermined time is about 0.25 sec.

21. The cup holder defined in claim 12 wherein the drive means includes an electric motor and the control means includes a current sensor for detecting current consumption by the motor and deenergizing the motor when the detected current consumption exceeds a predetermined threshold.

22. The cup holder defined in claim 12 wherein the drive means includes an electric motor and the control means includes a timer for deenergizing the motor a predetermined time after energizing the motor.

* * * * *